(12) United States Patent
Joyce

(10) Patent No.: US 12,128,609 B1
(45) Date of Patent: Oct. 29, 2024

(54) DOMAIN-BASED VARIABLE EXPOSURE FOR ADDITIVE MANUFACTURING DEVICES

(71) Applicant: B9CREATIONS, LLC, Rapid City, SD (US)

(72) Inventor: Michael Joyce, Rapid City, SD (US)

(73) Assignee: B9CREATIONS, LLC, Rapid City, SD (US)

( * ) Notice: Subject to any disclaimer, the term of this patent is extended or adjusted under 35 U.S.C. 154(b) by 0 days.

(21) Appl. No.: 17/943,607

(22) Filed: Sep. 13, 2022

Related U.S. Application Data

(60) Division of application No. 16/139,420, filed on Sep. 24, 2018, now Pat. No. 11,440,243, which is a continuation of application No. 14/541,800, filed on Nov. 14, 2014, now Pat. No. 10,081,130.

(60) Provisional application No. 61/904,091, filed on Nov. 14, 2013.

(51) Int. Cl.

| | |
|---|---|
| B29C 64/124 | (2017.01) |
| B29C 64/135 | (2017.01) |
| B29C 64/386 | (2017.01) |
| B29C 64/393 | (2017.01) |
| B33Y 10/00 | (2015.01) |
| B33Y 50/00 | (2015.01) |
| B33Y 50/02 | (2015.01) |
| B29C 64/129 | (2017.01) |
| B29K 101/12 | (2006.01) |
| B29K 105/24 | (2006.01) |

(52) U.S. Cl.
CPC .......... *B29C 64/124* (2017.08); *B29C 64/386* (2017.08); *B29C 64/393* (2017.08); *B29C 64/129* (2017.08); *B29C 64/135* (2017.08); *B29K 2101/12* (2013.01); *B29K 2105/246* (2013.01); *B33Y 10/00* (2014.12); *B33Y 50/00* (2014.12); *B33Y 50/02* (2014.12)

(58) Field of Classification Search
CPC ......... B33Y 10/00; B33Y 50/00; B33Y 50/02; B29K 2101/12; B29K 2105/246; B29C 64/124; B29C 64/129; B29C 64/135; B29C 64/386

See application file for complete search history.

(56) References Cited

U.S. PATENT DOCUMENTS

| | | | |
|---|---|---|---|
| 2,775,758 A | 12/1956 | Munz | |
| 5,182,056 A | 1/1993 | Spence | |
| 5,855,837 A | 1/1999 | Scranton et al. | |
| 10,081,130 B2 * | 9/2018 | Joyce | B29C 64/124 |

(Continued)

*Primary Examiner* — Philip C Tucker
*Assistant Examiner* — Jimmy R Smith, Jr.
(74) *Attorney, Agent, or Firm* — Terry M. Sanks, Esq.; Beusse Sanks, PLLC

(57) ABSTRACT

Devices, systems, methods and computer program products are disclosed that facilitate part layer curing by an additive manufacturing device wherein each element of the part layer is exposed to light from a light source until the element receives sufficient energy to cure. In an aspect, received energy is calculated based on both the light received directly from the light source and light received from surrounding elements due to dispersion and other effects. The present disclosure enables consistent curing across a part layer, facilitate the creation of sharp outer structures, and allow fragile structures to be built alongside larger structures without a loss of quality, clarity, or resolution.

15 Claims, 8 Drawing Sheets

(56) References Cited

U.S. PATENT DOCUMENTS

2006/0076502 A1 4/2006 Boord et al.
2012/0039084 A1 2/2012 Eckhardt et al.
2013/0001834 A1 1/2013 El-Siblani et al.

* cited by examiner

DOMAIN-BASED VARIABLE EXPOSURE FOR ADDITIVE MANUFACTURING DEVICES

CROSS REFERENCE TO RELATED APPLICATION

This application is a Divisional of U.S. application Ser. No. 16/139,420 filed Sep. 24, 2018, now issued as U.S. Pat. No. 11,440,243 issued Sep. 13, 2022, which is a Continuation of U.S. application Ser. No. 14/541,800 filed Nov. 14, 2014, now U.S. Pat. No. 10,081,130 issued Sep. 25, 2018, and claims the benefit of U.S. Provisional Application No. 61/904,091 filed Nov. 14, 2013, the entire contents of which are incorporated herein by reference.

FIELD OF THE DISCLOSURE

The present disclosure generally relates to additive manufacturing devices and more particularly to systems, methods and computer program products for uniformly curing portions of a part being created by an additive manufacturing device.

BACKGROUND

The statements in this section merely provide background information related to the present disclosure and may not constitute prior art.

Additive manufacturing devices produce three-dimensional parts by sequentially adding materials in a pattern. Some classes of additive manufacturing devices produce polymer parts solidified from a photopolymer resin which has been exposed in a layer-wise fashion to electromagnetic radiation generated by a light source such as a projector. The light source projects a cross sectional image into a build area, solidifying a layer of photopolymer resin into a hardened layer, thereby adding another layer to the object being formed. Ideally, energy output received at each portion of the layer being formed is consistent.

Receiving consistent energy across a layer is essential because the photopolymer resin only hardens into a solid form when exposed to sufficient flux of a specific wavelength of light. If an area to be hardened is not exposed to a sufficiently intense burst of light, it will "undercure" and not solidify in a desirable fashion. Additionally, if an area to be hardened is overexposed, the area will over harden, or "overcure," which may hamper the building process by, for example, sticking to the build area surface or hardening more resin than required, thereby creating a deformed or failed build. Where uniform light intensity is used to form a layer, undercuring often occurs at the edges of a layer being formed. Undercuring may also occur at fine structures such as thin poles, arms, webbing, and the like.

Inconsistency of curing occurs across a layer because solid portions of a layer, fine portions, and the edges of each layer being formed receive differing amounts of curing energy. This inconsistency occurs because light does not travel through the material being cured in a completely linear fashion. Among other things, there is dispersion, reflection and other optical effects. Additionally, the optical characteristics of the photopolymer resins changes as it cures.

Due to these phenomena, the amount of light energy received by a given portion of a layer being formed is dependent on both the light received directly from the light source and light received from surrounding portions due to dispersion and other effects.

Given the foregoing, what is needed are devices, systems, methods, and computer program products which facilitate uniform curing of layers and other portions of a part being formed by an additive manufacturing device. Furthermore taking into account light energy received from surrounding portions being cured is needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure provide devices, systems, methods, and computer program products which facilitate part layer curing by an additive manufacturing device wherein each element of the part layer is exposed to light from a light source until the element receives sufficient energy to cure. In particular, received energy is calculated based on both the light received directly from the light source and light received from surrounding elements due to dispersion and other effects.

In an aspect, light, electromagnetic radiation, or other curing energy is projected onto a material such as liquid photopolymer resin in order to cure a layer or other portion of the material, thereby forming a new portion of the part (e.g., a part layer). Light is projected onto the material via a light source. Specifically, the light source projects an image comprised of discrete elements (e.g., light from individual pixels). Each portion of the layer being formed receives light directly from the light source and light from surrounding illuminated layer portions. Each portion of the layer being formed requires a given amount of energy, a curing threshold value, to cure properly. In order to ensure that each portion of the layer being formed receives the curing threshold value of energy, the total amount of energy received at each portion of the layer being formed is calculated. The amount of energy received directly from the light source and the amount of light received from surrounding portions over a base exposure time is calculated. This calculated total amount is compared to the curing threshold value. If the calculated energy is greater than or equal to the curing threshold value, the portion is exposed for the base exposure time. If the calculated amount is less than the curing threshold value, an additional exposure time chosen to provide sufficient energy is calculated and the portion is exposed for a time equal to the base exposure time plus the additional exposure time.

Devices, systems, methods, and computer program products in accordance with the present disclosure enable consistent curing across a part layer, facilitate the creation of sharp outer structures, and allow fragile structures to be built alongside larger structures without a loss of quality, clarity, or resolution. Additionally, overcuring and bleeding may be minimized, thereby creating consistent channels, holes, and other openings in parts created via additive manufacturing. Stress upon separation layers and cure inhibiting layers is reduced.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to devices, systems, methods, and computer program products which facilitate consistent curing across a part layer of a part being constructed via an additive manufacturing device.

In an aspect, each element of the part layer is exposed to light from a light source until the element receives sufficient energy to cure. The amount of received energy is calculated based on both the light received directly from the light source and light received from surrounding elements due to dispersion and other effects.

Figure 1:
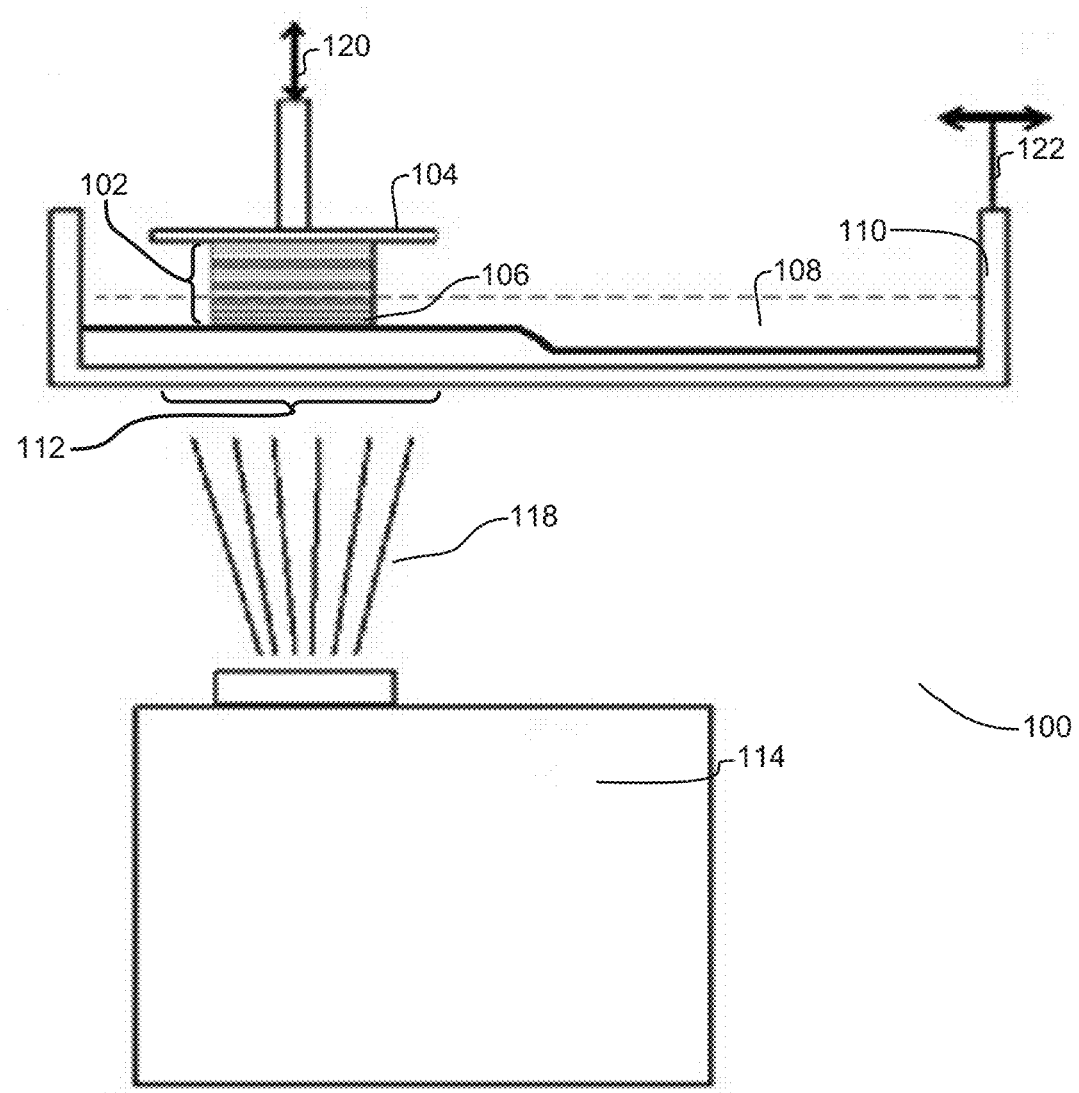
FIG. 1 is a schematic side view of an additive manufacturing device, according to an aspect of the present disclosure.

Referring now to FIG. 1, a schematic side view of an additive manufacturing device 100, according to an aspect of the present disclosure, is shown. The device 100 comprises a light source 114 supplying curing energy and a build area 112 positioned adjacent to a curable material. The light source 114 cures portions of the curable material adjacent to the build area, each portion comprising a plurality of elements. The device 100 comprises an additive manufacturing device controller 140 connected to the light source 114. The additive manufacturing device controller 140 comprises an exposure time module 145 configured to receive portion information indicating a portion of the three-dimensional object to be cured, calculate, for at least a portion of the plurality of elements, an ambient curing energy received from a subset of elements, the subset of elements being surrounding elements from the plurality of elements, and determine, for each of the at least a portion of the plurality of elements, an exposure time based on the calculated ambient curing energy 146 received, a direct energy value 147 and a curing threshold value 148; and an exposure module 150 configured to operate the light source 114 according to the determined exposure times 152.

Additive manufacturing device 100 constructs a part 102 by curing photopolymer resin 108 via exposure to electromagnetic radiation 118 from a light source 114. Light source 114 projects light 118 into a build area 112 in a pattern which causes a photopolymer layer 106 to harden into a new portion of part 102, thereby constructing part 102 in a layer-wise fashion. During construction, part 102 is attached to build table 104. Build table 104 is configured to support part 102 as part 102 is being constructed. Build table 106 may comprise a planar, movable surface attached to a z-axis actuator 120. Z-axis actuator 120 is configured to raise part 102 in a step-wise fashion during construction such that additional layers may be added to part 102.

Additive manufacturing device 100 may comprise basin 110 and y-axis actuator 122. Basin 110 is configured to house resin 108. Build area 112 may comprise a portion of basin 110. In an aspect, a bottom portion of basin 110 corresponding with build area 112 is transparent.

Y-axis actuator 122 is configured to alter the position of basin 110, thereby facilitating release of a newly-formed part layer from basin 110 and build area 112 via a horizontal sliding motion.

As will be apparent to those skilled in the relevant art(s) after reading the description herein, systems, methods, and computer program products in accordance with the present disclosure may be used with other types of additive manufacturing devices apart from the device 100 detailed in FIG. 1.

Figure 2:
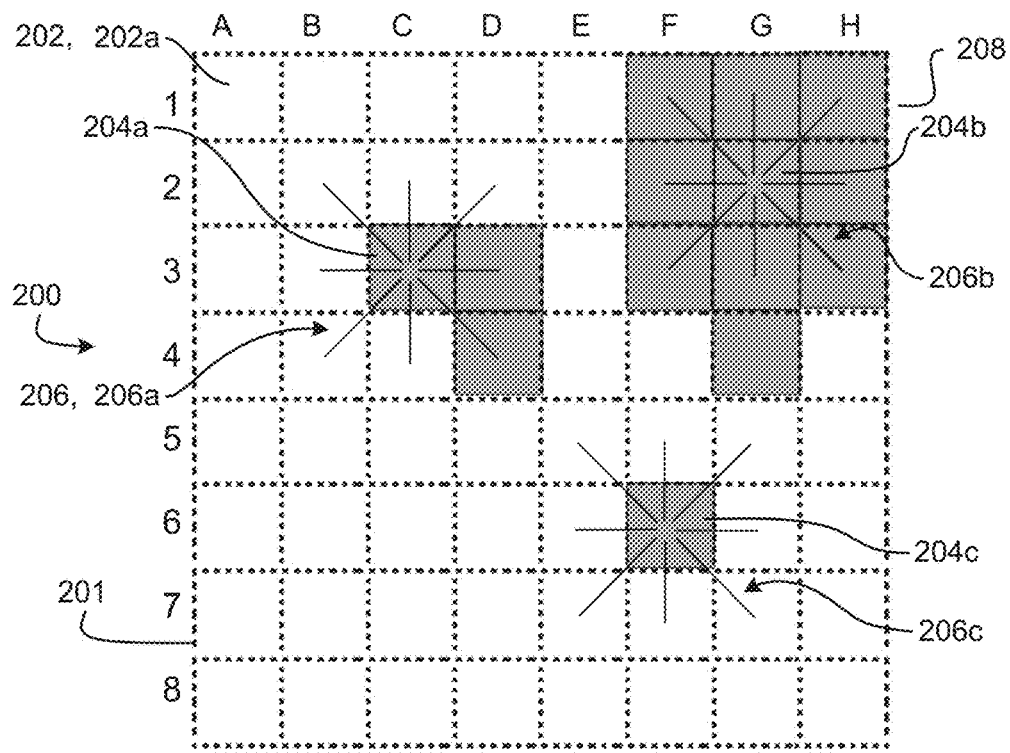
FIG. 2 is a diagram of a layer image wherein energy from surrounding elements is taken into account, according to an aspect of the present disclosure.

Referring now to FIG. 2, a diagram of layer image 200 wherein energy from surrounding elements 202 is taken into account, according to an aspect of the present disclosure, is shown.

In FIGS. 2 through 6D, a grid 201 is shown for reference, indicating build area 112. In FIGS. 6A-D grid 201 is solid. In FIGS. 2 through 5, grid 201 is dashed.

Each layer 106 of part 102 is formed by projecting at least one layer image 200 into build area 112, thereby curing photopolymer resin 108 in layer 106 corresponding with the one or more layer images 200 projected. Layer image 200 may correspond with all or a portion of build area 112. Layer image 200 comprises one or more cross sections 208 (shown, for clarity, as cross sections 208 in FIG. 2). Cross sections 208 are illuminated portions of layer image 200 (depicted as darkened areas in FIGS. 2 through 5). Layer 106 has a profile consistent with cross sections 208 after layer 106 cures.

Light source 114 may create layer image 200 by controlling the light output to areas of build area 112 corresponding with individual pixels or other controllable elements of light source 114. In some aspects, layer image 200 is a pixel-based image generated by a projector (i.e., light source 114). For example, projector may be a 1024×768 pixel resolution projector configured to project layer images 200 onto a 102.4 mm×76.8 mm build area 112. In another aspect, projector may be a 1280×720 pixel resolution device, a 1920×1080 pixel device, and the like. Layer image 200 may be a pixel-based or controllable element based image.

For clarity of illustration, FIGS. 2-5 depict a layer image 200 consisting of an 8-by-8 grid of elements 202 (labeled, for clarity, only as sector 202*a* in FIG. 2). In FIGS. 2 through 5, element 202 corresponds with a single controllable element of light source 114. In another aspect, element 202 may correspond to a plurality of controllable elements of light source 114 (e.g., a 64×64 pixel region). FIGS. 2 through 5 shall in no way limit the application of the present disclosure to other light sources 114, higher densities of controllable elements, or other aspects apparent to those having skill in the relevant art(s) after reading the description herein.

Aspects of the present disclosure determine the amount of energy per unit time received by a portion of layer 106 being cured with corresponds with each controllable element of light source 114. A portion of layer 106 being cured may correspond with an illuminated element 204 (shown, for clarity, only as illuminated elements 204*a-c* in FIG. 2) of cross section 208.

In an aspect, the amount of energy received at illuminated element 204 during a base time period (e.g., ten seconds) is calculated. The total amount of energy (per unit time, for a base time, for a given time, or the like) received at illuminated element 204 is calculated by determining the amount of energy received directly from light source 114 and adding light received from surrounding portions of layer 106 being cured via dispersion, reflection, refraction, diffraction and other optical and energy transfer effects.

The amount of energy received directly from the light source 114 may be determined via measurement (e.g., using a light meter) or via calculation (e.g., dividing total power output of light source 114 by the number of pixels projected). This amount may be stored in a database within additive manufacturing device 100 or otherwise stored and accessed during the calculations described herein.

The amount of energy received from surrounding portions of layer 106 being cured may be calculated by taking into account a variety of factors 160 including, but not limited to: distance away from illuminated element 204; the amount of light received at a surrounding portion (i.e., is a corresponding element 202 illuminated and if so how much energy is being sent by such element 202); density of photopolymer resin 108; the optical properties of resin 108; and the pigmentation of resin 108.

In an aspect, light received from surrounding portions of layer 106 being cured is calculated by summing the light received from each element 202 of layer image 200. In another aspect, light received from a limited number of surrounding portions of layer 106 being cured is summed. Light received from elements 202 one element away, as shown by radius 206 (shown, for clarity, only as radii 206*a-c* in FIG. 2) may be considered. In another aspect, light received from all elements 202 within a four element radius are considered. In another aspect, light received from all elements 202 within a 9-by-9 block centered on illuminated element 204 are considered. Limited the elements 202 considered may speed calculation time without significantly affecting part production quality. The amount of light received from element 202 may be stored in a database, determined by applying a correction factor to the amount of light directly received at element 202, determined by calculating the distance away from illuminated element 204 and reducing the amount of light received from element 202 by the inverse square of the calculated distance, a combination of such methods, or by other methods apparent to those having skill in the relevant art(s) after reading the description herein.

In some aspects, the radius is a consideration radius. Light or other curing energy from elements outside of the consideration radius is not considered.

As shown by radius 206*a*, when considering light received within one element, Illuminated element 204*a* (located at C3 in grid 201) receives light directly from C3 and indirectly from elements 202 at D3 and D4.

As shown by radius 206*b*, when considering light received within one element, Illuminated element 204*b* (located at G2 in grid 201) receives light directly from G2 and indirectly from elements 202 at F1-3, G1, G3, and H1-3. Although element 202 at G4 is illuminated, light received from G4 is not considered in such a calculation because it is two elements distant from illuminated element 204*b*. Because illuminated element 204*b* receives a relatively significant amount of light from surrounding elements 202 per unit time, illuminated element 204*b* may be exposed for a base time or a shorter amount of time and still achieve a satisfactory cure of the portion of layer 106 corresponding with illuminated element 204*c*.

As shown by radius 206*c*, when considering light received within one element, Illuminated element 204*c* (located at F6 in grid 201) receives light directly from F6 and receives no additional light from surrounding elements 202 because they are not illuminated. Because illuminated element 204*c* receives less light from surrounding elements 202 per unit time, it may be necessary to expose illuminated element 204*c* longer than illuminated elements 204*a* and 204*b* are exposed in order to achieve a satisfactory cure of the portion of layer 106 corresponding with illuminated element 204*c*. Edge portions and fine structures of part 102 often do not receive significant light from surrounding elements 202 when they are being formed, necessitating longer exposure times and/or being exposed to brighter light.

Figure 3:
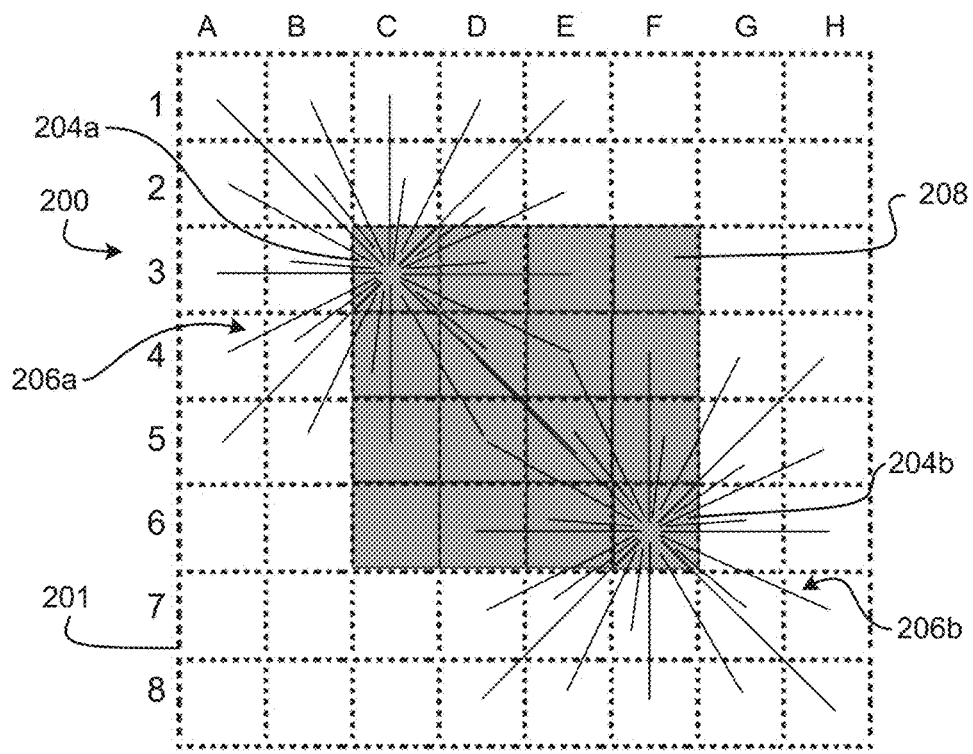
FIG. 3 is a diagram of a layer image wherein energy from two surrounding rings of elements is taken into account, according to an aspect of the present disclosure.

Referring now to FIG. 3, a diagram of layer image 200 wherein energy from two surrounding rings of illuminated elements 204*a-b* is taken into account, according to an aspect of the present disclosure, is shown.

The energy received by each illuminated element 204*a* in cross section 208 of layer image 200 may be calculated based on the amount of light directly received from light source 114 and the amount of light received from surrounding elements 202. In FIG. 3, the amount of light received at illuminated elements 204*a* and 204*b* is calculated based in part on the amount of light received from elements within a two element radius, as shown by radius 206*a* and 206*b*.

Figure 4:
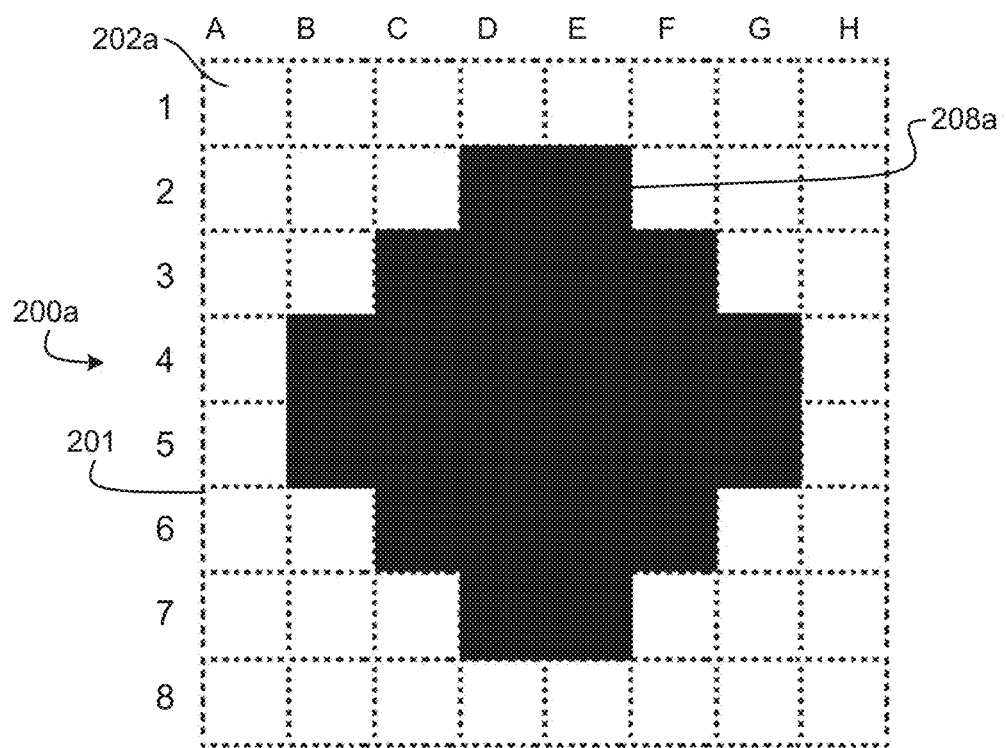
FIG. 4 is a diagram of a layer image configured to solidify a circular layer of an object being formed, according to an aspect of the present disclosure.
Figure 5:
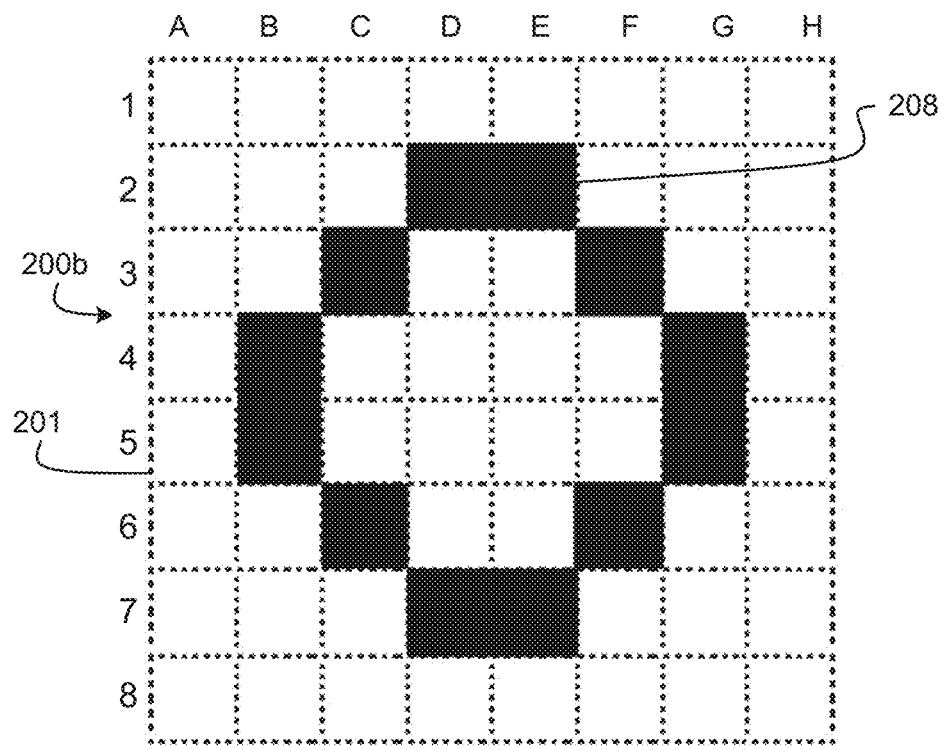
FIG. 5 is a diagram of a layer image configured to solidify a portion of circular layer of an object being formed wherein the portion requires additional energy in order to solidify, according to an aspect of the present disclosure.

Referring now to FIGS. 4 and 5, diagrams of layer images 200*a-b* configured to solidify a circular layer 106 of part 102 being formed, according to an aspect of the present disclosure, are shown.

In order to uniformly cure layer 106, layer image 200*a* of FIG. 4 is first projected for a base exposure time. FIG. 5 depicts layer image 200*b* configured to solidify the circumference of circular layer 106 and is projected before or after layer image of FIG. 4 in order to uniformly cure the outer ring of layer 106. The outer ring of layer 106 requires additional exposure to achieve the desired cure because the outer ring of layer 106 receives less energy during curing than inner portions of layer 106.

In an aspect, illuminated element 204 (e.g., element 202 at D3 in FIGS. 4 and 5) may be turned off before surrounding elements 202 are turned off (e.g., elements at D2 and E2 in FIGS. 4 and 5). The amount of energy received from surrounding portions of layer 106 being cured may include the energy received while illuminated element 204 is being exposed to light from light source 114 and energy received after illuminated element 204 is no longer being directly exposed to light from light source 114 but surrounding elements 202 are still illuminated.

Figure 6A:
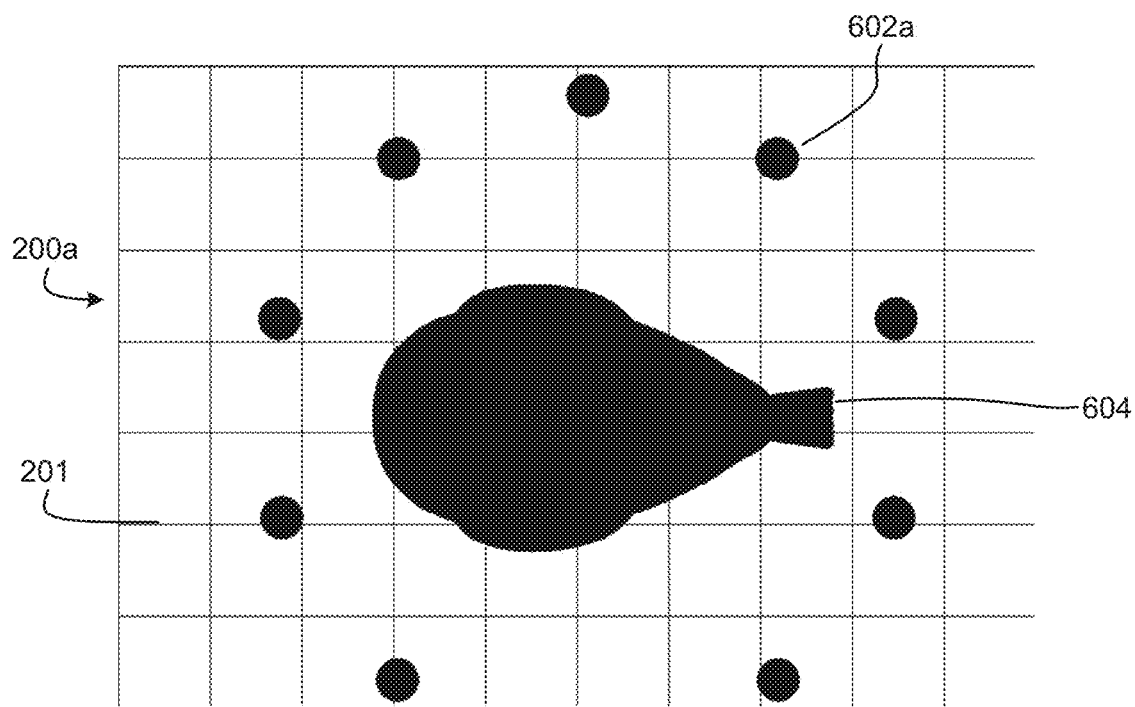
FIGS. 6A-D are diagrams of layer images projected onto photopolymer resin in order to solidify a layer of the photopolymer resin in the cross section depicted in FIG. 6A, according to an aspect of the present disclosure.

Referring now to FIGS. 6A-D are diagrams of layer images 200 projected onto photopolymer resin 108 in order to solidify layer 106 of photopolymer resin 108 in a profile of the cross section depicted in FIG. 6A, according to an aspect of the present disclosure, are shown.

Figure 6B:
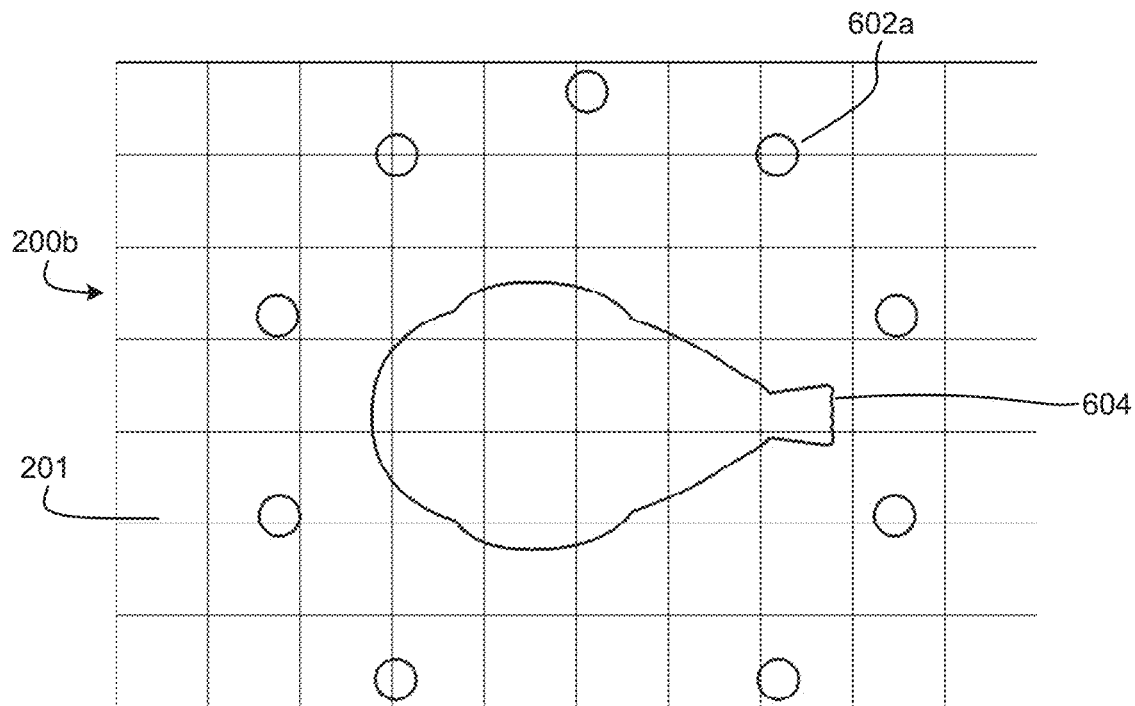
Figure 6C:
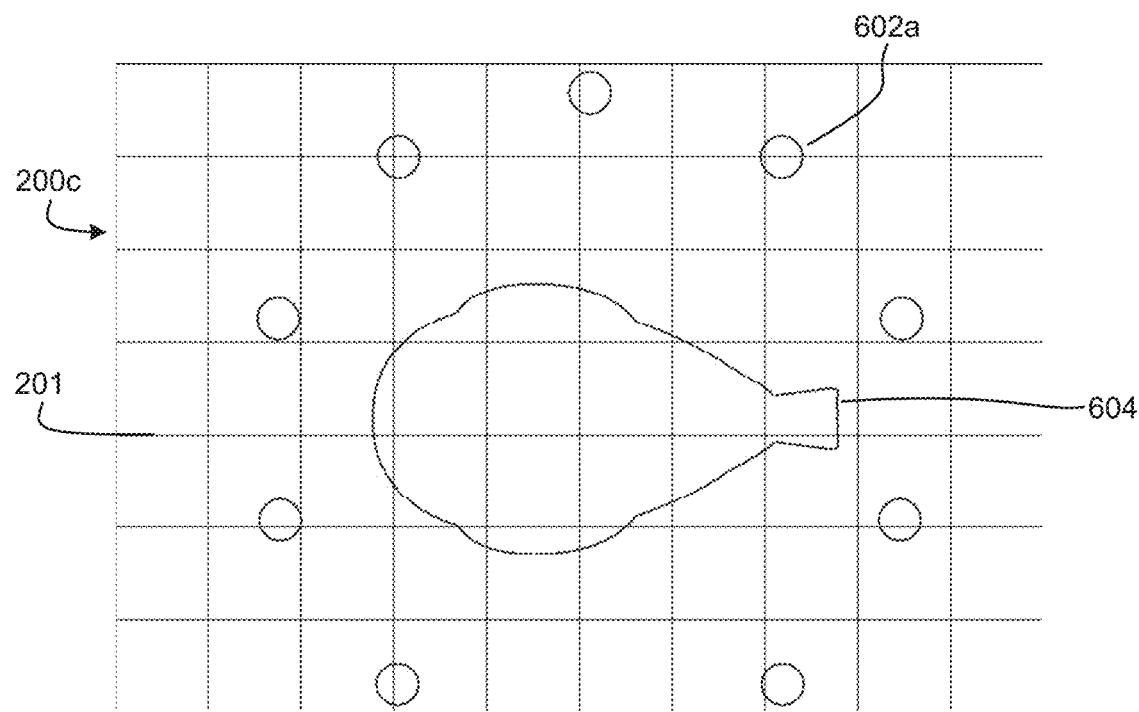
Figure 6D:
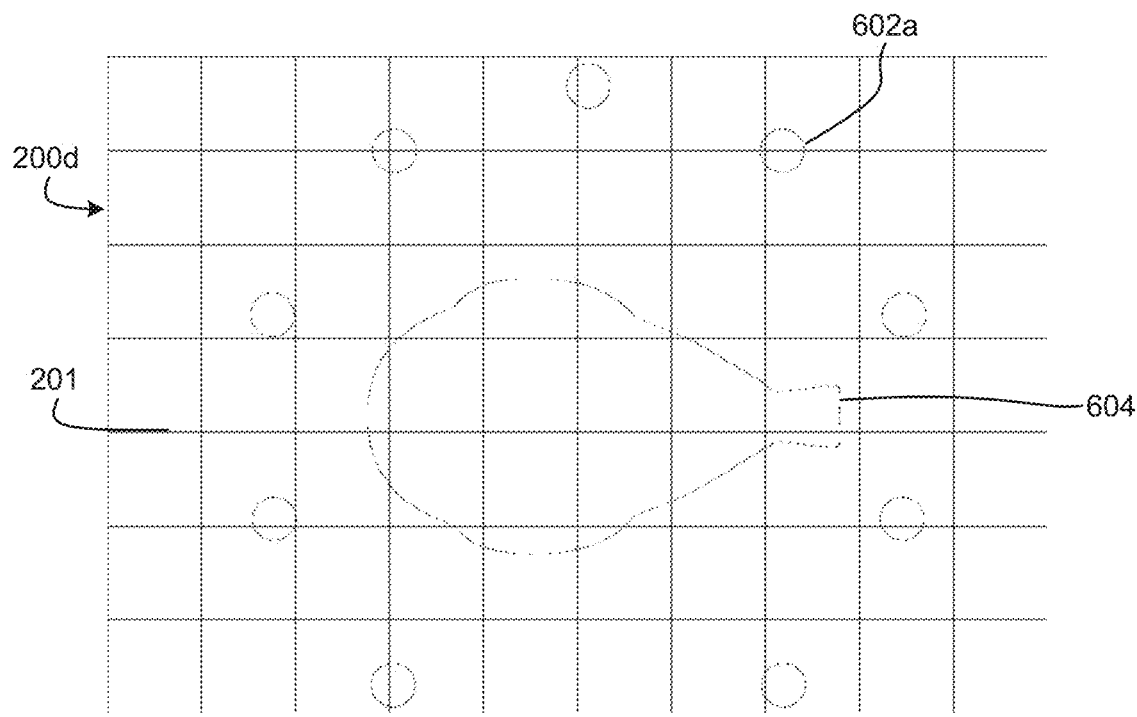

The exposure times of each portion of layer 106 being formed by layer images 200a-d in FIGS. 6A-D is calculated in order to provide a uniform cure across layer 106. Uncured photopolymer resin 108 is first exposed to layer image 200a for a base time. Edge portions 602a and 604 of layer 106 will not be cured to a desired level from this exposure therefore additional layer images 200b-d are projected, providing the necessary light to achieve a desired cure throughout layer 106. As shown in FIGS. 6B-D, fewer and fewer portions of layer 106 need extra exposure times, with the finest edge portions 602a and 604 of layer 106 requiring the longest exposure. In an aspect, the base exposure time is five to ten seconds and additional layer images are projected for all or a portion of an additional exposure time. In an aspect, the additional exposure time is three to six seconds. Each portion of layer 106 may be exposed for all or a portion of the additional exposure time, thereby creating layer images 200b-d. In an aspect, the additional exposure time is divided into 255 units of additional time and each portion of layer 106 is exposed for zero to 255 units of additional time.

Figure 7:
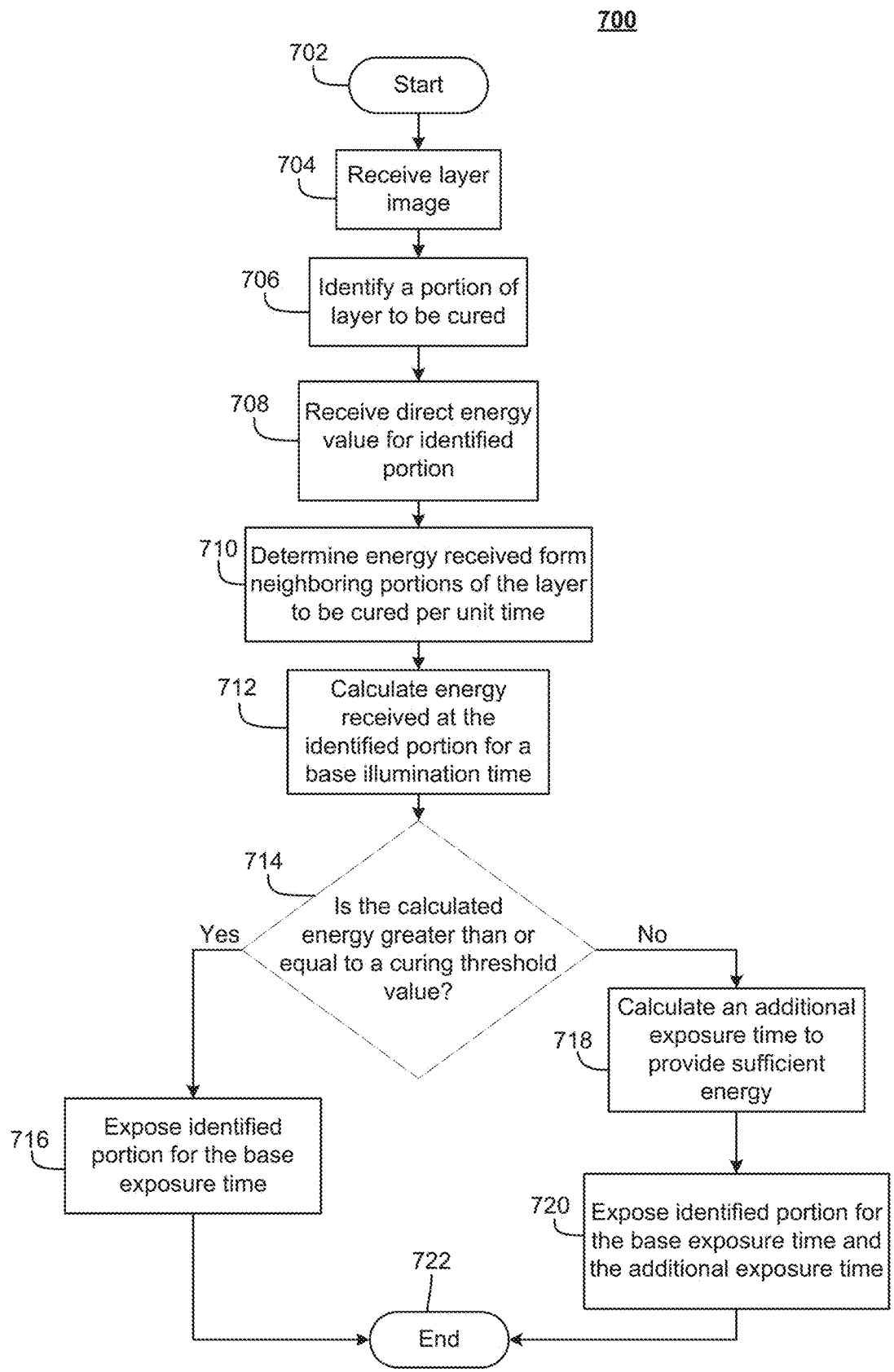
FIG. 7 is a flowchart illustrating an exemplary process for providing hardening energy to an illuminated element based on energy directly received and energy received from surrounding elements via adjustment of illuminated element exposure time, according to an aspect of the present disclosure.

Referring now to FIG. 7, a flowchart illustrating an exemplary process 700 for facilitating determining and calibrating light output levels in additive manufacturing device 100, according to an aspect of the present disclosure, is shown.

In an aspect, light, electromagnetic radiation, or other curing energy is projected onto a material such as liquid photopolymer resin in order to cure layer 106. Each portion of layer 106 being formed requires a given amount of energy, a curing threshold value 148, to cure properly. The curing threshold value 148 may be a minimum amount of light or other energy received. In another aspect, exposure of each portion of layer 106 is chosen to ensure that each portion of layer 106 is cure for more that the curing threshold value 148, but less than a curing limit value in order to avoid overcuring any portion of layer 106.

Process 700, at least a portion of which may execute within computing functionality 900, utilizes device 100 to determine and calibrate light output levels in additive manufacturing device 100 in order to uniformly cure layer 106, begins at step 702 with control passing immediately to step 704.

At step 704, a cross section of layer 106 to be cured is received. For example, if a sphere is being produced, a circular cross section would be received. In an aspect, the cross section received is a pixel-based image which may be projected by light source 114.

At step 706, a portion of the layer 106 to be cured is identified. The identified portion may correspond with the projection of a controllable element (e.g., a pixel) of light source 114 onto build area 112. In an aspect, the controllable element is illuminated element 204 and the identified portion is the portion of layer 106 that cures above illuminated element 204 when layer image 200 is projected onto build area 112.

At step 708, a direct energy value 147 is received for the layer portion identified in step 706. The direct energy value 147 may be a stored value for the amount of light sent directly to the layer portion.

At step 710, the amount of energy received from surrounding portions of layer 106 as it is being cured is determined. This amount may be an ambient curing energy value. It may be generated as an energy per unit time value. In another aspect, it is an absolute amount of energy received over a base exposure time. In an aspect, this is determined by summing the light energy received due to dispersion, reflection, refraction, diffraction and other optical and energy transfer effects from each portion of layer 106 being formed which corresponds with each element 202 which has been illuminated in order to cure part 106. In another aspect, the amount of energy received from surrounding portions of layer as it is being cured is determined by summing the light energy received from only a portion of layer 106 being formed (e.g., portions within a four pixel radius of the identified portion). The determination may yield a per unit time value.

At step 712, the amounts determined in steps 708 and 710 are used to calculate the total energy received at the identified portion for a base illumination time (e.g., ten seconds).

At determining step 714, the calculated total energy from step 712 is compared to a curing threshold value 148. If the calculated total energy received is greater than or equal to the curing threshold value 148, step 716 executes. At step 716, the identified portion is exposed for the base illumination time. Step 722 then executes and process 700 terminates.

If the calculated total energy received is less than the curing threshold value 148, step 718 executes. At step 718, the amount of additional time necessary to provide the identified portion with energy greater than or equal to the curing threshold value 148 is calculated based on the amounts determined in steps 708 and 710 and the difference between the calculated total energy from step 712 and the curing threshold value 148. Step 720 then executes.

At step 720, the identified portion is exposed for a time equal to the base exposure time plus the additional time calculated in step 718. Process 700 then terminates at step 722.

Figure 8:
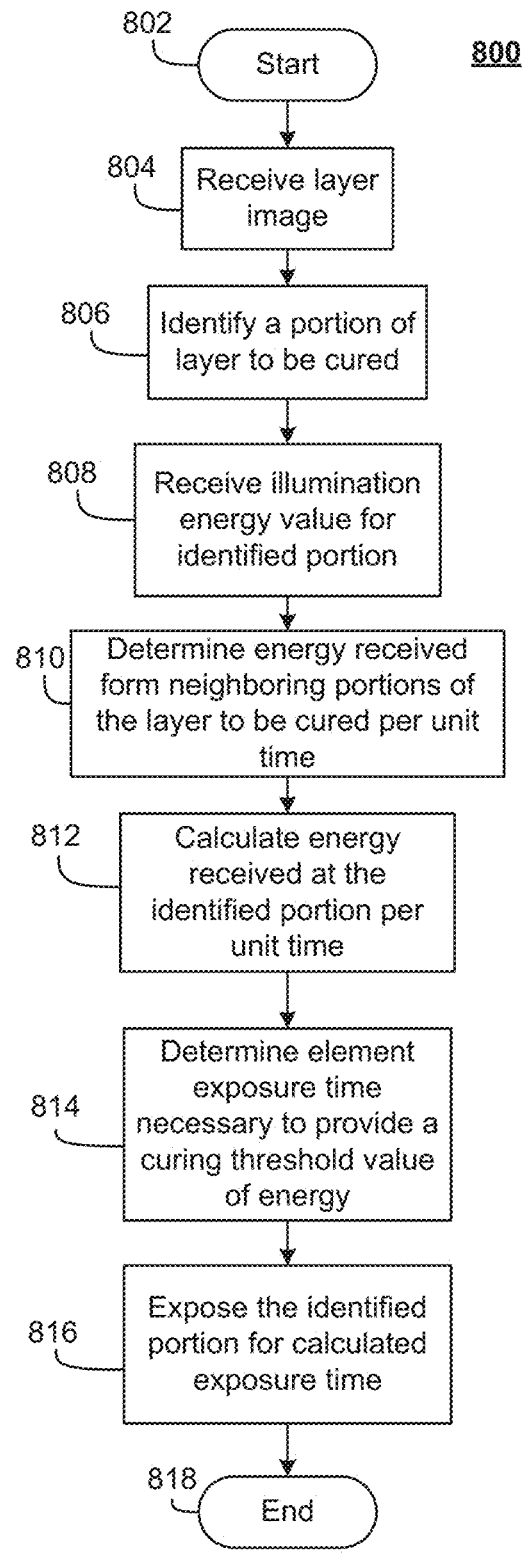
FIG. 8 is a flowchart illustrating an exemplary process for facilitating the formation of a portion of a part via calculation of an exposure time, according to an aspect of the present disclosure.

Referring now to FIG. 8, a flowchart illustrating an exemplary process 900 for facilitating the creation of part 102 utilizing stored light output levels, according to an aspect of the present disclosure, is shown.

Process 800, at least a portion of which may execute within computing functionality 900, utilizes device 100 and facilitates the creation of part 102 utilizing stored light output levels, begins at step 802 with control passing immediately to step 904.

At step 804, a cross section of layer 106 to be cured is received. In an aspect, the cross section received is a pixel-based image which may be projected by light source 114.

At step 806, a portion of the layer 106 to be cured is identified. The identified portion may correspond with the projection of a controllable element (e.g., a pixel) of light source 114 onto build area 112.

At step 808, a direct energy value 147 is received for the layer portion identified in step 806. The direct energy value 147 may be a stored value for the amount of light sent directly to the layer portion.

At step 810, the amount of energy received from surrounding portions of layer 106 as it is being cured is determined. In an aspect, this is determined by summing the light energy received due to dispersion, reflection, refraction, diffraction and other optical and energy transfer effects from each portion of layer 106 being formed which corresponds with each element 202 which has been illuminated in order to cure part 106. In another aspect, the amount of energy received from surrounding portions of layer as it is being cured is determined by summing the light energy received from only a portion of layer 106 being formed (e.g., portions within a four pixel radius of the identified portion). The determination may yield a per unit time value.

At step 812, the amounts determined in steps 808 and 810 are used to calculate the total energy received per unit time at the identified portion of layer 106.

At step 814, an exposure time for the identified portion is determined. In an aspect, a curing threshold value of energy is divided by the calculated total energy per unit time from step 812, yielding an exposure time which will provide the desired curing level for the identified portion.

At step 816, the identified portion is exposed to light from light source 114 for the exposure time calculated in step 814.

Process 800 then terminates at step 818.

As will be apparent to those skilled in the relevant art(s) after reading the description herein, processes discussed herein may be adapted to other types of additive manufacturing devices. For example, although processes 700 and 800 are described in terms of a projector-based additive manufacturing device 100, exposure times for identified portions may be calculated for stereolithography additive manufacturing devices. Based on the amount of energy received by moving laser or other SLA energy source as it comes close to the identified portion, the identified portion may be exposed for a longer or shorter time to the laser, thereby providing a threshold value of energy to the identified portion. This may occur via moving the laser faster/slower, having multiple passes, pausing on the identified portion, or the like.

Figure 9:
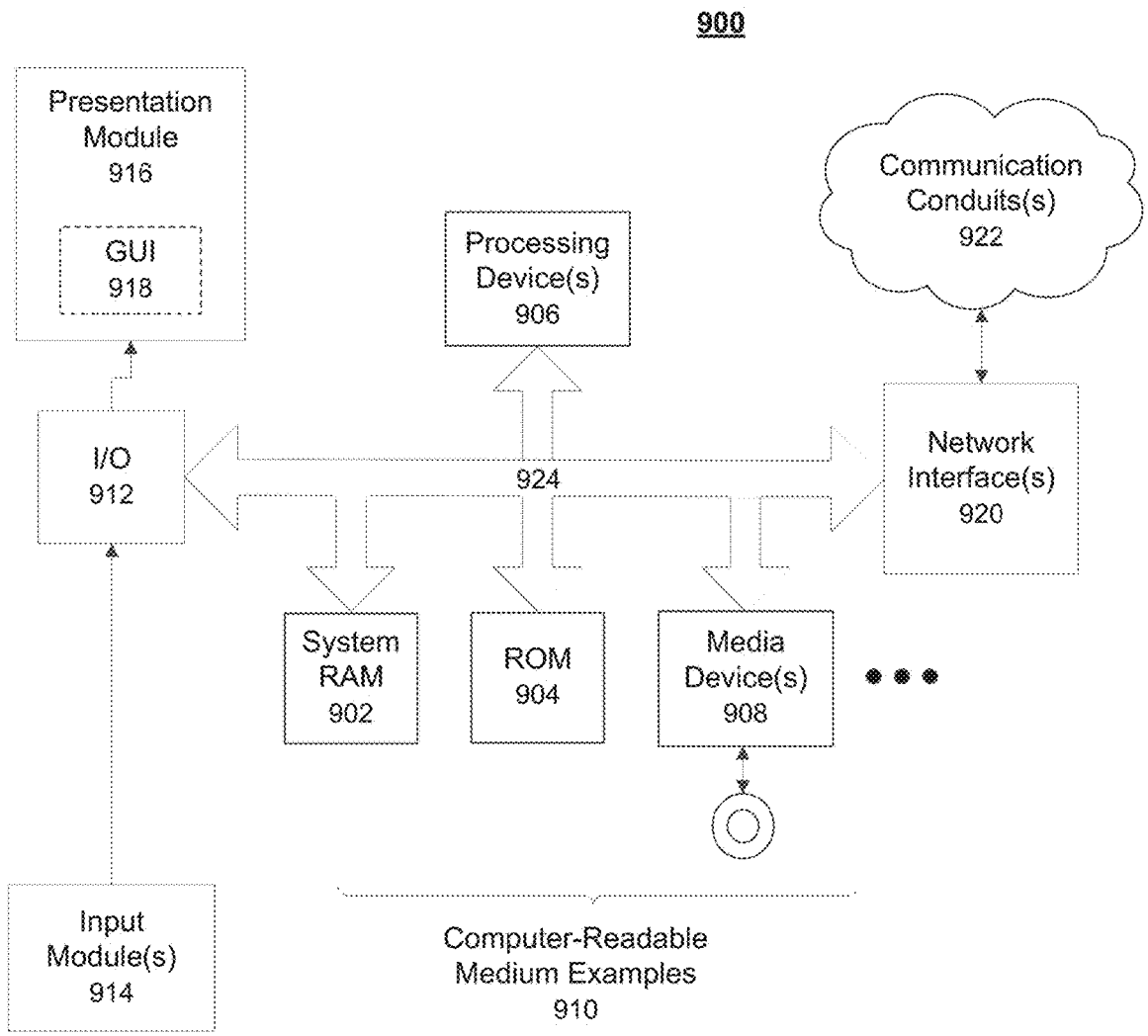
FIG. 9 is a block diagram of an exemplary computing system useful for implementing aspects of the present disclosure.
Figure 9:
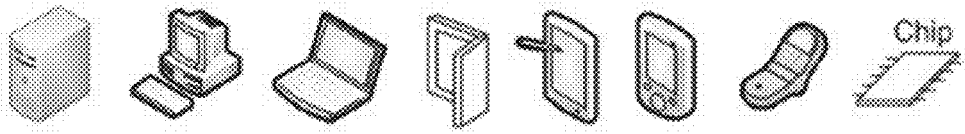

Referring now to FIG. 9, a block diagram of an exemplary computer system useful for implementing various aspects the processes disclosed herein, in accordance with one or more aspects of the present disclosure, is shown.

That is, FIG. 9 sets forth illustrative computing functionality 900 that may be used to device control software, device 100, or any other component utilized herein. In all cases, computing functionality 900 represents one or more physical and tangible processing mechanisms.

Computing functionality 900 may comprise volatile and non-volatile memory, such as RAM 902 and ROM 904, as well as one or more processing devices 906 (e.g., one or more central processing units (CPUs), one or more graphical processing units (GPUs), and the like). Computing functionality 900 also optionally comprises various media devices 908, such as a hard disk module, an optical disk module, and so forth. Computing functionality 900 may perform various operations identified above when the processing device(s) 906 execute(s) instructions that are maintained by memory (e.g., RAM 902, ROM 904, and the like).

Instructions and other information may be stored on any computer readable medium 910, including, but not limited to, static memory storage devices, magnetic storage devices, and optical storage devices. The term "computer readable medium" also encompasses plural storage devices. In all cases, computer readable medium 910 represents some form of physical and tangible entity. By way of example, and not limitation, computer readable medium 910 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 902, ROM 904, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 900 may also comprise an input/output module 912 for receiving various inputs (via input modules 914), and for providing various outputs (via one or more output modules). One particular output module mechanism may be a presentation module 916 and an associated GUI 918. Computing functionality 900 may also include one or more network interfaces 920 for exchanging data with other devices via one or more communication conduits 922. In some embodiments, one or more communication buses 924 communicatively couple the above-described components together.

Communication conduit(s) 922 may be implemented in any manner (e.g., by a local area network, a wide area network (e.g., the Internet), and the like, or any combination thereof). Communication conduit(s) 922 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein, implementation utilizing other additive manufacturing devices). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A method of creating a three-dimensional (3D) object via an additive manufacturing device by curing a plurality of portions of the 3D object from a curable material, each portion comprising a plurality of elements, at a build plane via exposure of each of the plurality of elements to a curing energy of a curing energy source, the curing energy source controllable by an additive manufacturing device (AMD) controller, the method comprising the steps of:
    (a) receiving, at the AMD controller, portion information indicating a portion of the 3D object to be cured;
    (b) calculating, for at least one element of the plurality of elements of the portion, via the AMD controller, an ambient curing energy received from a subset of elements, the subset of elements being surrounding elements that surround the at least one element wherein the ambient curing energy is based on exposure to the curing energy radiated from the curing energy by the surrounding elements;
    (c) operating the curing energy source to cause curing of the curable material receiving the curing energy from the curing energy source to form the portion of the 3D object;
    (d) reducing overcuring of the surrounding elements as the curable material is cured due to the exposure of the surrounding elements to the ambient curing energy, wherein the reducing of the overcuring, during the step (c), is by:
        i) determining, for each of the at least one element of the plurality of elements of the portion, via the AMD controller, an exposure time based on the calculated ambient curing energy received, a direct energy value and a curing threshold value, prior to the step (c), wherein the curing threshold value is based in part on the curable material physical properties, and
        ii) controlling and operating the curing energy source, by the AMD controller, according to the determined exposure time for said each of the at least one element of the plurality of elements of the portion, as the curable material is cured; and
    (e) repeating the steps of (a)-(d) for remaining portions of the plurality of portions until the 3D object is created.

2. The method of claim 1, wherein the ambient curing energy received is an energy per unit time.

3. The method of claim 1, wherein the curing direct energy value is an energy per unit time.

4. The method of claim 1, wherein the portion information is a layer image.

5. The method of claim 1, wherein:
    each of the subset of elements provides a portion of the ambient curing energy received; and
    calculating step (b) is based on scaling factors stored within the additive manufacturing device, the scaling factors being based on distance from the at least one element to each of the subset of elements.

6. The method of claim 1, wherein the subset of elements is limited by a consideration radius.

7. The method of claim 6, wherein the consideration radius is smaller than a build plane outer dimension.

8. The method of claim 6, wherein the consideration radius is less than five elements.

9. The method of claim 1, wherein the curing energy source includes a pixel-based projector, wherein each of the plurality of elements corresponds to a pixel of the pixel-based projector.

10. The method of claim 1, wherein the curing energy source is one of: a DMD device; a DLP projector; and a laser.

11. The method of claim 1, wherein the curing threshold value is based in part on a three-dimensional object cure level provided by a user.

12. The method of claim 1, wherein the calculating, for said at least one element of the plurality of elements of the portion, via the AMD controller, the ambient curing energy received from the subset of elements comprises the method step of:
    summing the curing energy received by said at least one element due to at least one of dispersion, reflection, refraction, diffraction and optical and energy transfer effects from each element of the subset of elements.

13. The method of claim 1, wherein the calculating, for said at least one element of the plurality of elements of the portion, via the AMD controller, the ambient curing energy received from the subset of elements comprises the method step of:
    determining an amount of the curing energy received at each surrounding element of the subset of elements and the amount of the received energy being sent by said each surrounding element.

14. The method of claim 13, wherein the ambient curing energy is based on a distance of said each surrounding element relative to said at least one element.

15. The method of claim 1, wherein the ambient curing energy is based on at least one of: density of the curable material, optical properties of the curable material, and pigmentation properties of the curable material.

* * * * *